US012614555B2

(12) United States Patent
Delikaris Manias

(10) Patent No.: US 12,614,555 B2
(45) Date of Patent: Apr. 28, 2026

(54) METHOD AND SYSTEM FOR PRODUCING AN AUGMENTED AMBISONIC FORMAT

(71) Applicant: Apple Inc., Cupertino, CA (US)

(72) Inventor: Symeon Delikaris Manias, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 18/476,267

(22) Filed: Sep. 27, 2023

(65) Prior Publication Data

US 2025/0104719 A1 Mar. 27, 2025

(51) Int. Cl.
*G10L 19/008* (2013.01)
*G10L 25/03* (2013.01)
*H04S 3/00* (2006.01)

(52) U.S. Cl.
CPC ............ *G10L 19/008* (2013.01); *G10L 25/03* (2013.01)

(58) Field of Classification Search
CPC ..... G10L 19/008; G10L 19/167; G10L 25/21; G10L 25/03; H04S 3/008; H04S 2420/11; H04S 2400/11; H04S 2400/15; H04S 2400/01; H04S 2420/01; H04S 7/30; H04S 7/304; H04S 7/302; H04S 7/303; H04S 7/308; H04S 2420/13; H04S 3/004; H04S 5/005; H04S 1/007; H04S 2400/09; H04S 7/00; H04H 20/89; H04R 5/027; H04R 5/033; H04R 5/02; H04R 1/323; H04R 2430/20; H04R 3/12; H04R 3/14; H04R 5/00
USPC .......... 704/500–504; 381/1–23, 92, 122, 119
See application file for complete search history.

(56) References Cited

U.S. PATENT DOCUMENTS 10,798,511 B1 * 10/2020 Sheaffer .................. H04S 7/305
2009/0316913 A1 * 12/2009 McGrath .................. H04S 3/02 381/20
2015/0081310 A1 * 3/2015 Keiler ....................... H04S 7/30 704/500
2017/0366912 A1 * 12/2017 Stein ..................... G10L 19/167
2019/0104364 A1 * 4/2019 Nawfal ................... H04S 5/005

OTHER PUBLICATIONS

Colby Ramsey, "Supersphere Brings Native Ambisonic Sound to Immersive live Events", received from https://audiomediainternational.com/supersphere-brings-native-ambisonic-sound-to-immersive-live-events/, Apr. 25, 2019, 2 pages.

(Continued)

*Primary Examiner* — Leshui Zhang
(74) *Attorney, Agent, or Firm* — Aikin & Gallant, LLP

(57) ABSTRACT

A method that includes receiving audio content in a first-order ambisonics (FOA) format that includes a first plurality of audio signals, producing a plurality of spatially rendered audio signals by spatially rendering the first plurality of audio signals according to a layout of a virtual loudspeaker array, determining one or more filters by performing a parametric analysis upon at least one of the first plurality of audio signals, filtering at least one of the plurality of spatially rendered audio signals using the one or more filters; and producing a second plurality of audio signals in a higher-order ambisonics (HOA) format based on the plurality of spatially rendered audio signals.

20 Claims, 6 Drawing Sheets

(56) References Cited

OTHER PUBLICATIONS

Colby Ramsey, "G'Audio Lab Launches Live Streaming Audio for 360-Degree Video", received from https://www.thebroadcastbridge.com/content/entry/10360/gaudio-lab-launches-live-streaming-audio-for-360-degree-video, Jan. 22, 2018, 3 pages.
Luke, "Gaudio Works Plugin: How to download", received from https://www.gaudiolab.com/blog/114, May 8, 2019, 4 pages.
Avid, "What's New in Pro Tools| Software and Pro Tools| HD Software", Version 12.5, 2016, 55 pages.
Firtha et al., "Comparison of methods for upmixing B-format RIRs to Higher Order Ambisonics", received from https://www.researchgate.net/publication/358501873_Comparison_of_methods_for_upmixing_B-_format_RIRs_to_Higher_Order_Ambisonics, Sep. 23-24, 2021, 10 pages.
Bai et al., "Spatial sound field synthesis and upmixing based on the equivalent source method", received from https://pubs.aip.org/asa/jasa/article-abstract/135/1/269/564660/Spatial-sound-field-synthesis-and-upmixing-based?redirectedFrom=fulltext, Jan. 1, 2014, 15 pages.
Lin et al., "Exploiting Audio-Visual Consistency with Partial Supervision for Spatial Audio Generation", received from https://cdn.aaai.org/ojs/16302/16302-13-19796-1-2-20210518.pdf, 2021, 8 pages.
Cobos et al., "An overview of machine learning and other data-based methods for spatial audio capture, processing, and reproduction", received from https://asmp-eurasipjournals.springeropen.com/articles/10.1186/s13636-022-00242-x, May 16, 2022, 21 pages.
Jin et al., "Theory and Design of Multizone Soundfield Reproduction Using Sparse Methods", received from https://ieeexplore.ieee.org/document/7268847, Sep. 15, 2015, 13 pages.

* cited by examiner

METHOD AND SYSTEM FOR PRODUCING AN AUGMENTED AMBISONIC FORMAT

FIELD

An aspect of the disclosure relates to a system that produces an augmented ambisonics format of one or more audio signals. Other aspects are also described.

BACKGROUND

Ambisonics is a surround sound format in which a sound field may be represented by a summation of spherical harmonic functions. As the spherical harmonic functions are extended to include higher-order elements (order of two and higher), the representation of the sound field may become more detailed, thereby having a higher spatial resolution during spatial reproduction of the sound field. The term higher-order ambisonics ("HOA") may be used to generically refer to such a representation of the sound field.

SUMMARY

An aspect of the disclosure may include a method and a system for producing an augmented ambisonics format for a piece of audio content. Audio content may be received, where the content may be in a first-order ambisonics (FOA) format that includes a first group of audio signals, such as four audio signals. The first group of audio signals may be spatially rendered to produce a group of spatially rendered audio signals according to a layout of a virtual loudspeaker array. The layout may be based on a desired higher-order ambisonics (HOA) format for the audio content, such as a $2^{nd}$ order ambisonics format that may include nine signals. One or more filters may be determined by performing a parametric analysis upon at least one of the first group of audio signals. In one aspect, the parametric analysis may produce one or more parameters from the first group of audio signals that may quantify one or more properties of sound field of the audio content. In one aspect, one or more parameters may include at least one of a direction of arrival (DoA) associated with a sound source of the audio content, a diffuseness of the audio content, inter-channel level differences between two or more of the first group of audio signals, inter-channel time differences between the two or more of the first group of audio signals, and inter-channel coherence between the two or more of the first group of audio signals. The filters may be determined based on the spatially rendered audio signals and the one or more parameters. At least one of the spatially rendered audio signals may be filtered using the one or more filters, and a second group of audio signals may be produced in a HOA format based on the (filtered) spatially rendered audio signals.

In one aspect, the system may determine the HOA format as a desired HOA format for the audio content, where the second group of audio signals is produced in the desired HOA format by encoding the spatially rendered audio signals according to the desired HOA format. In another aspect, the system may determine one or more vector-base amplitude panning (VBAP) gains based on the layout of the virtual loudspeaker array, where the first group of audio signals are spatially rendered according to the VBAP gains. In some aspects, the second group of audio signals may be stored in a storage device.

In one aspect, the layout of the virtual loudspeaker array may include virtual loudspeakers of the virtual loudspeaker array that are evenly distributed on a surface of a sphere centered around a virtual listening position, where each of the spatially rendered audio signals may be associated with a respective virtual loudspeaker of the virtual loudspeaker array.

According to another aspect of the disclosure is an electronic device that includes at least one processor and memory having instructions stored therein which when executed by the at least one processor causes the electronic device to: receive a group of microphone signals that includes sound of an ambient environment captured by a group of microphones. In one aspect, the microphones may be a part of the electronic device that may be located within the ambient environment, or a part of another electronic device that may be communicatively coupled with the device.

The electronic device determines one or more parameters associated with the ambient sound by performing a parametric analysis upon at least one of the plurality of microphone signals, produces several spatially rendered audio signals by spatially rendering the microphone signals to a virtual loudspeaker array, and produces a group of filtered audio signals by filtering at least one of the spatially rendered audio signals based on the parameters. For instance, the electronic device may determine a desired HOA format for encoding the filtered audio signals and determine a layout of the virtual loudspeaker array based on the desired HOA format, where the microphone signals may be spatially rendered according to the layout of the virtual loudspeaker array. In one aspect, the electronic device may determine one or more VBAP gains based on the layout, where the microphone signals may be spatially rendered using the VBAP gains. In another aspect, the layout of the virtual loudspeaker array includes an even distribution of the virtual loudspeaker array on a surface of a sphere centered around a virtual listening position, where each of the spatially rendered audio signals may be associated with a respective virtual loudspeaker of the virtual loudspeaker array.

The electronic device may encode the filtered audio signals into several HOA signals (e.g., in the desired HOA format). In one aspect, the HOA signals includes a sound field that includes the sound of the ambient environment, and is an upmix from the captured microphone signals.

According to another aspect of the disclosure is a processor that may be configured to receive a first group of audio signals that may include audio content. For example, the audio signals may be in a FOA format of the audio content, or may be microphone signals captured by microphones. The processor produces several spatially rendered audio signals by spatially rendering the first group of audio signals according to a layout of several virtual loudspeakers, and may produce several filtered audio signals by filtering at least one of the spatially rendered audio signals based on a sound-field analysis of the first group of audio signals. The processor encodes the filtered audio signals into a second group of signals in a HOA format that may include the audio content, where the second group of audio signals is an upmix of the first group of audio signals.

In one aspect, the processor may be configured to determine the HOA format as a desired HOA format for the audio content; and determine one or more VBAP gains based on the desired HOA format, where the first group of audio signals are rendered using the one or more VBAP gains. In another aspect, the processor is further configured to determine the layout of the virtual loudspeakers using the HOA format. In some aspects, the layout of the virtual loudspeakers include an even distribution of the virtual loudspeaker array on a surface of a sphere centered around a virtual listening position. In one aspect, the processor is further configured to at least one of: store the second group of audio signals in the HOA format in memory of the electronic device; and produce a speaker drivers to drive speakers by spatially rendering the second group of audio signals according to a speaker layout of the speakers.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
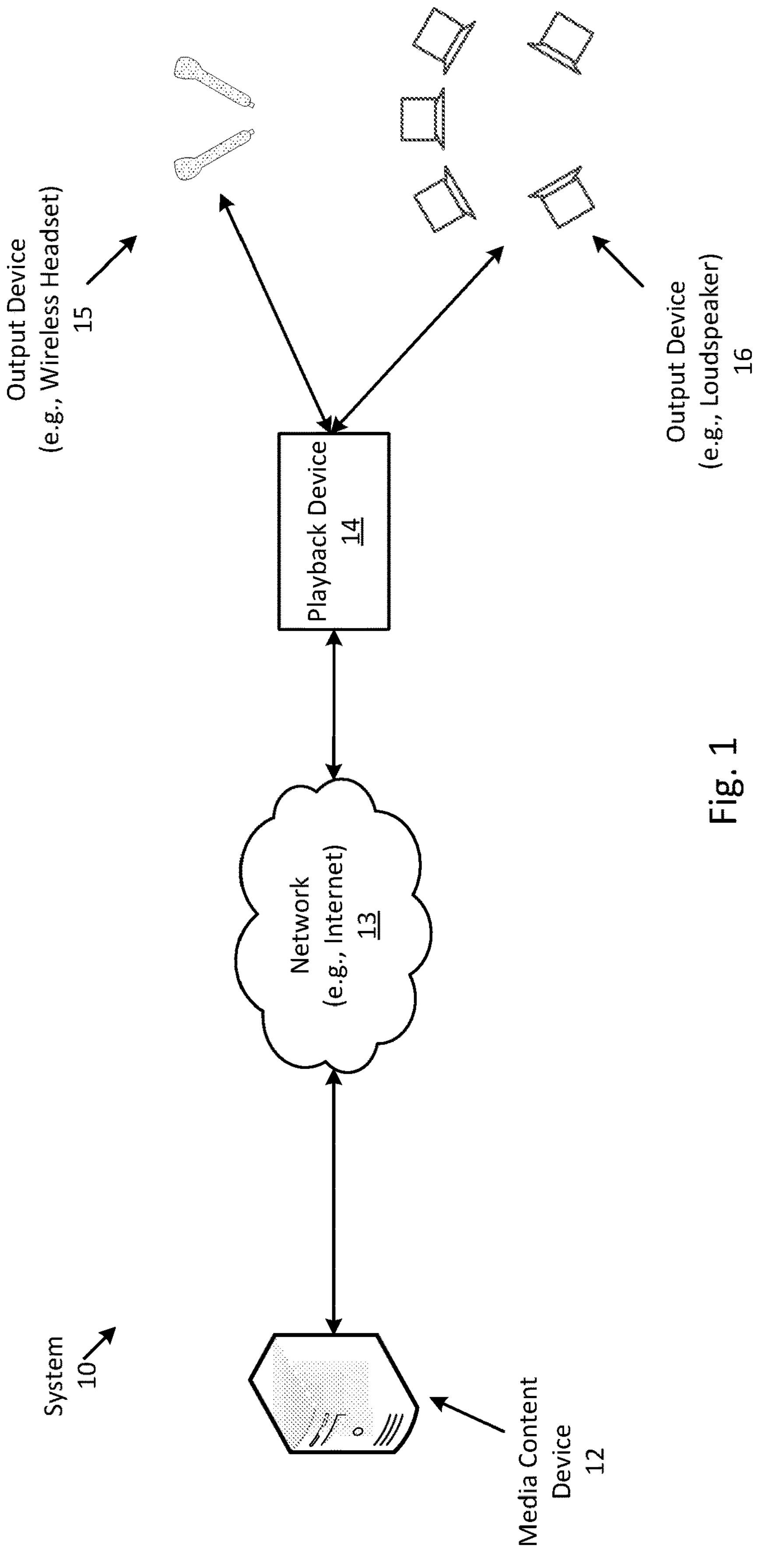
FIG. 1 shows a system that produces an augmented ambisonics format.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

As described herein, to "augment" audio content may refer to upmixing the audio content from a lower number of channels (of which the audio content may be originally received or produced) to a higher number of channels that may include or represent the audio content.

An audio program may be recorded and stored in a spherical audio format, such as an ambisonics audio format. In which case, a sound field may be recorded as an ambisonics representation (ambisonics data) and stored as an audio file. As an example, audio content may be recorded using a microphone array (e.g., using a special microphone array with microphones arranged in a particular arrangement, such as a spherical microphone array), and stored as several channels, such as ambisonics B-format or higher order. As another example, a sound field, such as sound of a virtual environment may be produced in an ambisonics format. Ambisonics audio format has flexibility when compared to other types of audio formats that specify specific playback configurations, such as stereo, 5.1 surround sound, etc., because ambisonics audio recordings can be rendered to different playback configurations. In other words, ambisonics audio recording files do not specify or require a particular playback arrangement.

A higher-order ambisonics (HOA) signal may be characterized by a high number of channels. In particular, a three-dimensional (3D) sound field representation of (a piece of) audio content may include (e.g., be represented by) a number of (ambisonics) channels defined by $(M+1)^2$, where M is the order. For example, a first-order ambisonics (FOA) recording may include four channels, a $2^{nd}$ order ambisonics recording may include nine channels, while a $3^{rd}$ order ambisonics recording may include sixteen channels. Different orders of ambisonics may include different spatial resolutions during playback. In particular, the spatial resolution of an ambisonics recording may depend on its order. For example, the FOA recording may have a low spatial resolution, due to only having four audio channels that may result in blurry sound sources during rendering and playback by an audio rendering system. As the order of ambisonics increases, however, spatial resolution may improve, but as a result, the number of channels may also increase, thereby increasing the amount of data and complexity.

There may be two methods for capturing and rendering a sound field using ambisonics as an input format. A first is a non-parametric (or linear) spatial audio rendering process. In this approach, ambisonics signals may be mixed linearly to produce a desired output format, such as a stereo format (e.g., for headphones) or a surround sound format, such as 5.1 surround sound format. For example, the FOA includes four signals: a signal W corresponding to an omnidirectional beam pattern, and three signals, X, Y, and Z, which correspond to different figure-of-eight patterns. To linearly produce a stereo reproduction, which includes a left channel and a right channel, the $1^{st}$ order ambisonics may be spatially rendered by combining at least some of the ambisonics signals. For instance, the left channel may be a linear combination of the W signal and Y signal, while the right channel may be a difference between the W signal and the Y signal. As a result, a non-parametric spatial audio reproduction of an ambisonics signal may require a small amount of computational power, but may not provide sufficient spatial resolution during playback.

A second method is a parametric spatial audio (rendering) process, which may provide a higher resolution capture and rendering performance than the linear approach. In this approach, a sound field may be captured as a set of ambisonics signals and analyzed (through a parametric spatial audio analysis) to estimate a set of parameters that describe the captured sound field. In particular, a "parameter" may be any spatial characteristic that may help to define or classify one or more properties of a sound field. Examples of parameters may include a direction of arrival (DoA) that may be associated with a sound source of a sound field, or a diffuseness of the sound field. The parameters, along with at least some of the original ambisonics signals may be used by a spatial audio renderer to synthesize the captured sound field and render it for any type of speaker layout, such as headphones or loudspeakers. Unlike non-parametric spatial audio rendering, parametric rendering may require a significant amount of computational power.

As described herein, ambisonics has the advantage of being a flexible spatial audio format that may be rendered for any desired speaker layout, such as headphones or a loudspeaker layout. Such a format may be widely used for audio of an extended reality (XR) environment (e.g., virtual reality (VR), augmented reality (AR), and/or mixed reality (MR) environment) since it may provide an easy and effective way to manipulate a recorded or synthesized sound field, e.g., by beamforming to different directions, rotating a sound field, zooming, etc. Most conventional recordings performed in ambisonics format are of a lower order, such as FOA. When rendering FOA, the spatial resolution is very low and the spatial image presented to the user is usually inside the user's head, when rendered through a headset for example. As described herein, as the order of ambisonics increases, the spatial resolution may also increase and thereby enhance the user listening experience. This, however, may require a very high number of channels at time of audio capture. For example, capturing $3^{rd}$ order ambisonics requires sixteen channels and a $5^{th}$ order requires thirty-six channels. Capturing thirty-six channels, however, may be computationally and physically (mechanically) unpractical. Therefore, there is a need to augment, such as upmixing, captured lower-order ambisonics, such as FOA into a higher-order ambisonics.

To solve this problem, the present disclosure provides a method and system for spatial audio processing to produce an augmented ambisonics format from a lower-order ambisonics (or from a lesser number of microphone signals, as described herein). The system receives audio content in a FOA format that may include a first group of audio signals, such as the four ambisonics channels, as described herein. The method produces spatially rendered audio signals by spatially rendering the first group of audio signals according to a layout of a virtual loudspeaker array, such as a t-design. The system determines one or more filters by performing a parametric analysis upon at least one of the first group of audio signals, and filters at least one of the spatially rendered audio signals using the filters. The system produces a second group of audio signals in a HOA format (e.g., going from $1^{st}$ order to $3^{rd}$ order ambisonics) based on the spatially rendered audio signals. As a result, the system is capable of low-channel count at capture time and high resolution at rendering time, due to the augmentation of the originally received audio content.

FIG. 1 shows an audio system (or "system") 10 that produces an augmented ambisonics format of audio content. The system may produce the augmented ambisonics format as an upmix of a lower-order ambisonics or of one or more microphone signals. As described herein, this may provide users with a more enhanced audio experience, e.g., providing higher spatial resolution at playback of audio content that is received in a lower-spatial resolution format, such as FOA. The audio system includes a playback (or companion) device 14, a network 13 (e.g., a computer network, such as the Internet), a media content device (or server) 12, and output device 15 or output device 16. In one aspect, the system may include more or less elements. For example, the audio system may include other output devices, or may only include one output device, such as device 15. As another example, the system may not include the media content device 12. As described herein, the device 12 may provide audio content to other devices, such as the playback device 14. In another aspect, the playback device may retrieve audio content from local memory instead of receiving the audio content from the media content device 12.

In some aspects, the media content device 12 may be a stand-alone server computer or a cluster of server computers configured to stream media content to electronic devices, such as the playback device and/or one or more output devices. In which case, the server may be a part of a cloud computing system that is capable of streaming data as a cloud-based service that is provided to one or more subscribers (e.g., of the local and/or remote device(s)). In some aspects, the server may be configured to stream any type of media (or multi-media) content, such as audio content that may include musical compositions, audiobooks, podcasts, etc., still images, video content that may include movies, television productions, etc. In one aspect, the server may use any audio and/or video encoding format and/or any method for streaming the content to one or more devices.

As referenced herein, "audio content" may be (and include) any type of (e.g., user-desired) audio, such as a musical composition, a podcast, audio of an XR environment, a soundtrack of a motion picture, etc. In another aspect, audio content may include sounds of one or more software applications (e.g., sounds of a virtual personal assistant (VPA) application), system sounds, or any type of sound for playback by an electronic device through one or more speakers. In another aspect, the audio content may include sounds of a call, such as a telephone call or a video conference (VOIP) call, which may be conducted by a telephony application with another electronic device. In which case, the audio content may include a downlink signal from the other electronic device. In one aspect, the audio content may be a part of a piece of audio content, which may be an audio program or audio file that includes one or more audio signals that includes at least a portion of the audio content. In some aspects, the audio program may be any type of audio content format. In one aspect, an audio program may include audio content for spatial rendering as one or more data files in one or various 3D audio formats, such as having one or more audio channels. For instance, an audio program may include a mono audio channel or may be a multi-audio channel format (e.g., two stereo channels, six surround source channels (in 5.1 surround format), etc.). In another aspect, the audio program may include one or more audio objects, each having at least one audio signal, and positional data (for spatially rendering the object's audio signals) in 3D sound. In another aspect, the audio program may be represented in a spherical audio format, such as FOA audio format or a higher-order format.

In some aspects, the playback device 14 may be any type of electronic device that may perform spatial audio processing operations and audio playback operations. For instance, the playback device may be a desktop computer, a laptop computer, a digital media player, etc. In one aspect, the playback device may be a portable electronic device (e.g., being handheld operable), such as a tablet computer, a smart phone, etc. In another aspect, the playback device may be a head-mounted device, such as smart glasses, or a wearable device, such as a smart watch.

As shown, the playback device 14 may be configured to communicatively couple with the media content device 12, via the network 13, such that both devices may be configured to communicate with one another using any communication protocol. In another aspect, any of the output devices may communicatively couple with the playback device 14 via the network 13. In one aspect, the network 13 may be any type of computer network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wireless local area network (WLAN), a cellular network, etc., in order to exchange digital (e.g., audio) data. With respect to the cellular network, the playback device 14 may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones).

In another aspect, the devices may be configured to wirelessly exchange data via other networks, such as a Wireless Personal Area Network (WPAN) connection. For instance, the output device 15 may be configured to establish a wireless connection with the playback device 14 via a wireless communication protocol (e.g., BLUETOOTH protocol or any other wireless communication protocol). During the established wireless connection, the devices may exchange (e.g., transmit and receive) data packets (e.g., Internet Protocol (IP) packets) with the digital (e.g., audio) data, which may include a representation of audio content that is being played back by the playback device 14.

As illustrated, the system 10 may include one or more output devices 15 and 16, each of which may be any electronic device that includes or may be communicatively coupled to at least one speaker and may be configured to output sound by driving the speaker. For instance, as illustrated, the output device 15 is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. In this case, the headset may include two earphones, a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In one aspect, the output device 15 may be any type of device that may be worn by a user and produce sound directed into the user's ears, such as a headset. In another aspect, the output device may be any type of electronic device that may be worn by a user, such as smart glasses. In one aspect, the device may include one or more "extra-aural" speakers, which may be arranged to output sound into the ambient environment rather than (directly) into the user's ears. In which case, the output device may be configured to use the extra-aural speakers to produce one or more beam patterns, each of which may include at least a portion of audio content in order to produce spatially selective sound output. Such beam patterns may be directed to locations within the environment, such as a location of the user's ears.

As illustrated, the output device 16 includes one or more loudspeakers. In particular, the output device 16 includes five loudspeakers that are arranged in a 5.1 surround sound loudspeaker arrangement. In one aspect, the output device 16 may be any electronic device that includes at least one loudspeaker that is arranged to output (or project) sound into an ambient environment. Examples may include a standalone speaker, a smart speaker, a home theater system, or an infotainment system that is integrated within a vehicle.

In one aspect, the playback device 14 may be configured to spatially render audio content to produce one or more output audio signals (or speaker drivers), with which the playback device may use to drive one or more speakers of the playback device 14, the output device 15, and/or the output device 16. For instance, upon producing the output audio signals, the playback device 14 may transmit the signals to the output device 15 for playback.

As described herein, the system 10 may be configured to perform spatial audio processing operations to produce an augmented ambisonics format. For instance, one or more devices of the system may perform at least some of these operations, such as the playback device 14. In another aspect, either of the output devices may perform at least some of the operations described herein. In which case, the playback device may be an optional device, whereby an output device, such as output device 15, may receive audio content, augment the audio content (e.g., upmix the audio content into a higher-order ambisonics), store the augmented audio content, and/or spatially render the augmented audio content through one or more speakers.

In some aspects, the playback device 14 and the output device 15 (or device 16) may be distinct (separate) electronic devices, as shown herein. In another aspect, the playback device may be a part of (or integrated with) an output device. For example, as described herein, at least some of the components of the playback device (such as a controller, memory, etc.) may be part of the output device 14, and/or at least some of the components of the output device, such as one or more speakers may be part of the playback device. In this case, each of the devices may be communicatively coupled via traces that are a part of one or more printed circuit boards (PCBs) within the devices.

Figure 2:
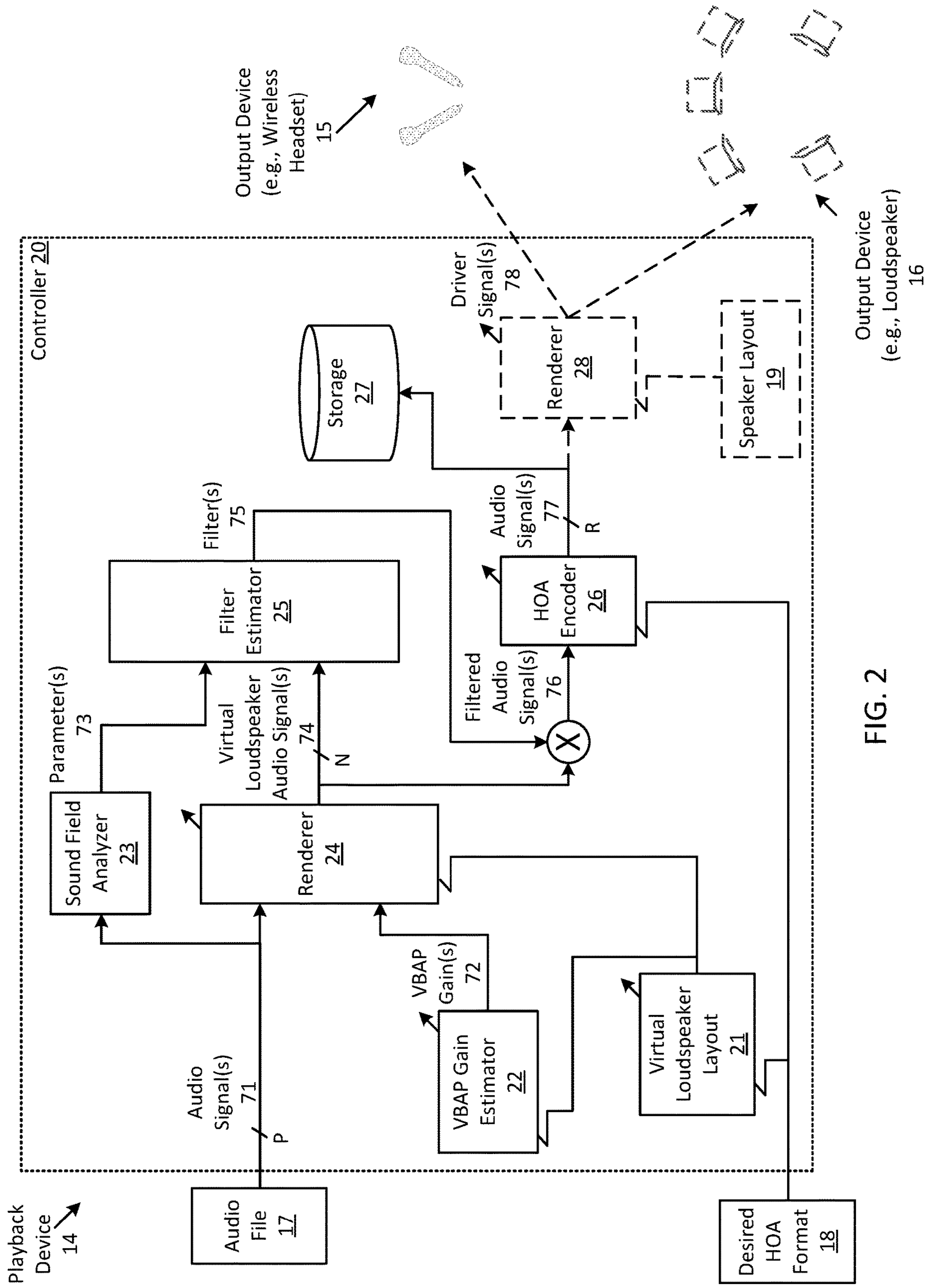
FIG. 2 is a block diagram of a playback device of the system that produces an augmented ambisonics format from a lesser order ambisonics according to one aspect.

FIG. 2 is a block diagram of a playback device of the system that produces an augmented ambisonics format from a lesser order ambisonics according to one aspect. The playback device 14 includes an audio file 17, a desired HOA format 18, and a controller 20. In one aspect, the audio file 17 and the desired HOA format 18 may be a part of or stored within memory of (e.g., the controller 20 of the) playback device 14. In one aspect, the elements may be a part of one or more other electronic devices, such as the audio file being a part of (e.g., stored in memory of) the media content device 12. In which case, the playback device may stream the audio file 17, via the network 13, from the media device 12. In another aspect, the controller 20 may be a part of another device, such as the output device 15. In which case, the operations described herein may be performed by an output device, and therefore the playback device 14 may be an optional device of the system 10.

The controller 20 may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller 20 may be configured to perform audio signal processing operations, such as spatial audio processing operations and/or networking operations. More about the operations performed by the controller 20 is described herein.

In one aspect, the audio file 17 may include any type of audio content, such as a musical composition. The audio file may include an ambisonics audio recording as one or more channels that may be formatted in B-format or higher in one of numerous higher-order ambisonics formatting conventions, for example ACN, SID, Furse-Malham or others and different normalization schemes such as N3D, SN3d, N2D, SN2D, maxN or others, which can result in additional loss. The audio file may include a FOA or HOA representation of a sound field that includes several audio signals (or channels). In some aspects, the audio file 17 may be produced (e.g., in a recording studio) to include audio content as an ambisonics recording. In another aspect, the audio file may be a recording of one or more microphones (not shown) of the system 10. In which case, microphones that may be a part of one or more devices of the system 10 may capture sound of the ambient environment, which may be stored in an ambisonics format.

The desired HOA format 18 includes an indication of an order of ambisonics, which may be greater than a FOA. For instance, the desired format may be a $3^{rd}$ order ambisonics or a $5^{th}$ order ambisonics. The format may be "desired" such that it may be user-defined. In which case, the format may be received through an input device, such as a tablet computer with a touch-sensitive display screen. In another aspect, the desired format may be predefined in a controlled setting, such as a laboratory.

The controller 20 has several operational blocks for performing audio spatial processing to produce an augmented ambisonics format of (a piece of) audio content. As shown, the controller includes a virtual loudspeaker layout 21, a gain estimator 22, a sound field analyzer 23, a (spatial audio) renderer 24, a filter estimator 25, a HOA encoder 26, a storage 27, a (optional) renderer 28, and a (optional) desired speaker layout 19. In one aspect, the controller may have more or less operational blocks. For example, the controller may include one or more gain estimators, each of which may be configured to estimate one or more gains that may be applied to the audio content. In another aspect, the controller may not include the renderer 28 and the desired speaker layout 19 since both of these blocks are optional. A description of the operational blocks is as follows.

The controller 20 may be configured to receive the audio file 17, which includes "P" audio signals 71 of audio content. As described herein, the audio content may be in a spherical audio format, such as a FOA audio format that includes a FOA representation of a sound field as several the several audio signals 71. In the case of FOA, the P=4. In one aspect, the controller may receive the audio file based on user input. For example, a user may request (e.g., via one or more user input devices, such as a touchscreen) a media software application being executed by the controller 20 to stream audio content (e.g., from the media content device 12). In which case, the controller 20 may receive the audio content as a FOA representation via the network 13. Alternatively, the controller 20 may retrieve the audio file 17 from memory, which may be internal (or a part of the playback device 14) or of an external device. In another aspect, the audio file 17 may be of another order of ambisonics, such as a $2^{nd}$ order. The controller 20 may be configured to determine a HOA format to which the received audio signal is to be upmixed as the desired HOA format 18 of the audio signal. In one aspect, the controller 20 may retrieve the desired HOA format 18 from memory, and/or the desired format may be received based on user input.

The virtual loudspeaker layout 21 may be configured to determine a layout of a virtual loudspeaker array based on the HOA format 18. In particular, the determined layout of the virtual loudspeaker array may include an even distribution of the virtual loudspeaker array on a surface of a sphere centered around a virtual listening position, where the arrangement and/or number of loudspeakers of the virtual loudspeaker array may be based on the desired HOA format 18. For example, the virtual layout may be a t-design of virtual loudspeakers, where t may be a parameter that may be based on the desired HOA format. In particular, the virtual layout 21 may include different t-designs for different orders of HOA. For instance, the parameter may be a function of the order of ambisonics, such that $t \geq 2N+1$, where N is the order of ambisonics. In one aspect, the parameter, t, may indicate the number of points along the sphere that may represent locations of virtual loudspeakers around the sphere, the distribution or arrangement of loudspeakers on the sphere, and/or the shape of the sphere may be based on the (e.g., order of the) desired HOA format. For instance, as the parameter increases, the number of loudspeakers on the sphere may increase as the order of the HOA format increases. As an example, when the order of ambisonics is N=2, the virtual layout may be a 5-design that may include an icosahedron with twenty faces (as equilateral triangles) with twelve points, each point representing a location of a virtual loudspeaker. In one aspect, to determine the layout 21 of the virtual array the controller 20 may perform a table lookup into a data structure that associates HOA formats with one or more spherical t-designs of virtual loudspeaker arrays.

The gain estimator 22 may be configured to determine one or more vector-base amplitude panning (VBAP) gains for spatially rendering the audio content of the audio signals 71 based on the desired HOA format 18. In particular, the estimator may determine one or more VBAP gains based on the layout of the virtual loudspeaker array determined by the layout 21. VBAP may use a triangulation of three loudspeakers to produce 3D sound, as a virtual sound source inside an area of the loudspeakers. To cause the 3D sound VBAP produces a gain vector (e.g., three gains, one for each loudspeaker) that may be applied as loudspeaker gains to one or more input audio signals. In the present case, the estimator 22 may determine one or more gain vectors for the virtual loudspeakers array. For instance, the estimator may determine one or more gain vectors for each group of virtual loudspeakers that make up vertices of each face of the sphere of the t-design. In which case, the estimator may determine gain vectors for one or more virtual sound sources within at least some of the faces of the sphere, with virtual loudspeakers at their vertices. In some aspects, the gain estimator 22 may determine one or more VBAP gains for each virtual loudspeaker in the virtual loudspeaker layout. In one aspect, to determine the VBAP gains 72, the estimator may perform a table lookup into a data structure that associates VBAP gains with virtual loudspeaker layouts.

The renderer 24 may be configured to receive the (audio signals 71 of the) audio content of the audio file 17 and the VBAP gains 72, and produce several virtual loudspeaker audio signals 74 as spatially rendered audio signals by spatially rendering the signals 71 according to the layout of the virtual loudspeaker array (from the layout 21). The renderer 24 may spatially render (e.g., linearly render) the audio signals 71 using the VBAP gains. In one aspect, the renderer may linearly render the audio signals by applying (e.g., multiplying) the VBAP gains 72 to at least some of the audio signals 71 to produce the virtual loudspeaker signals 74. In one aspect, the renderer may produce N virtual audio signals 74, at least one signal for each virtual loudspeaker of the virtual loudspeaker array determined by the layout 21 (based on the desired HOA format 18), where the virtual signals 74 may include at least a portion of the sound field of the original audio signals 71. In one aspect, to spatially render the sound field of the audio signals 71, the renderer may determine one or more virtual sound sources within the sound field that may be associated with (produced by) one or more virtual loudspeakers of the virtual loudspeaker array in order for the array to produce the sound field, and then select VBAP gains 72 associated with the virtual loudspeakers of the virtual loudspeaker array, which may then be applied to one or more of the audio signals associated with the virtual loudspeakers. In one aspect, the renderer may use any spatial rendering method to render the audio signals 71 to the virtual loudspeaker array associated with the desired HOA format.

Thus, the controller 20 may be configured to determine the gains 72 from the desired HOA format (order) 18 to match a corresponding virtual loudspeaker setup (arrangement). The virtual positions of the virtual loudspeakers may be derived based on the gains, and once gains have been determined the renderer may determine virtual sound sources in between the virtual loudspeakers by assigning one or more gains to the virtual loudspeakers.

As described thus far, the controller 20 may be configured to transform the audio content into the virtual loudspeaker audio signals 74 that may be an intermediate format associated with the uniform virtual loudspeaker array. In one aspect, if the spatially rendered audio signals were used to drive loudspeakers of the array, the sound produced by be very correlated and therefore less desirable. In which case, to improve the sound the controller may be configured to enhance the audio content by performing a parametric analysis to produce filters (e.g., sharpening filters) to be applied to at least some of the virtual signals before re-encoding the signals into a higher order of ambisonics. As a result, the controller may be configured to upmix the original ambisonics format into a higher order that with a higher spatial resolution. The parametric analysis may be as follows.

The sound field analyzer 23 may be configured to receive the audio signals 71 and perform a sound field analysis upon the signals to determine (produce) one or more (spatial) parameters 73 associated with (e.g., one or more sound sources of) the sound field of the (e.g., FOA data of the) audio content of the audio file 17. In one aspect, the analysis may be performed in the time-frequency domain. In which case, the controller may be configured to transform the audio signals 71, which may be in the time-domain, into the time-frequency signals. Time-frequency signals may include frequency components of the audio signals with respect to (or as a function of) time. The analyzer 23 may determine parameters of at least some time-frequency signals of the sound field that quantify one or more properties of the sound field depending on frequency and time. For example, the analyzer 23 may determine a DoA associated with one or more sound sources of the sound field based on an acoustic analysis of at least some of the time-frequency signals, such as being based on cross-correlation between two or more signals and/or acoustic intensity. The analyzer 23 may determine other parameters that may indicate spatial characteristics of one or more sounds of the sound field, such as inter-channel level differences (ICLD), inter-channel time differences (ICTD), and/or inter-channel coherences (ICC). As another example, the analyzer 23 may determine a direct-to-ambience ratio of sound of the sound field by identifying one or more directional components, which may be identified based on a strong correlation between two or more signals, whereas the ambience may be determined based on sound that is fully or partially uncorrelated with the directional component. Other parameters may include diffuseness of the sound field and reverberance of the sound field. In one aspect, the analyzer 23 may use any method to determine any type of parameter that may provide a quantitative properties of the sound field of the audio signals 71 in the time-frequency domain. For instance, the analyzer may estimate DoA of one or more sound sources using multiple signal classification analysis. The analyzer may use (e.g., non-linear) machine learning based methods for parameter estimation.

The filter estimator 25 may be configured to receive the parameters 73 produced by the analyzer 23 and one or more of the audio signals 74 (which may be transformed from the time-domain into the time-frequency domain), and may be configured to estimate (or determine) one or more adaptive filters 75 based on the parameters 73 and/or at least some of the audio signals 74. The filters 75 may include sharpening filters that may provide spatial enhancement of a spatial rendering of the audio content. For example, when applied to one or more of the virtual loudspeaker audio signals 74, the sharpening filters may enhance direction components of one or more signals. In which case, the filters may enhance sound (as perceived by a listener) of one or more sound sources within the sound field. In one aspect, the filters 75 may be non-linear and/or linear filters. The sharpening filters may be any type of audio filter, such as high-pass filters, low-pass filters, band-pass filters, etc. In another aspect, the filters may be signal-dependent. In particular, the adaptive filters may include time-frequency adaptive weights, which may be adaptive based on changes to the audio signal(s) 74. In one aspect, the filters produced by the estimator 25 may be based on the desired HOA format 18 in which the virtual signals 74 are to be encoded. The estimator 25 may produce one or more filters 75 for each of the audio signals for the virtual loudspeaker array. In which case, the estimator 25 may adjust the number and/or type of filters produced based on changes to the virtual loudspeaker array. For instance, if the desired HOA format changes, the filter estimator 25 may adjust the number of filters 75 produced (e.g., based on changes to the number of ambisonics signals associated with the changed format). In another aspect, the adaptive filters may be produced through any method using at least one of the audio signals 74 and/or at least one parameter 73.

The controller 20 may be configured to produce filtered audio signals 76 by applying (e.g., multiplying) the filters 75 to one or more of the virtual loudspeaker audio signals 74. In one aspect, the controller may filter the signals 74 using one or more filters in order to improve (enhance) the spatial resolution of the audio content, as described herein. The HOA encoder 26 may be configured to receive the filtered signals 76 and produce R audio signals 77 in the desired HOA format 18 by encoding the signals 76 according to the desired format 18. For instance, the encoder 26 may apply an encoding matrix upon at least some of the N filtered signals 76 to produce the audio signals 77. In one aspect, the HOA format of the audio signals 77 may be a higher order ambisonics of the audio format of the audio signals 71. In which case, the number of R signals of the audio signals 77 may be greater than the number of P signals of the audio signals 71. For instance, when the audio file 17 is a FOA, P=4, and when the HOA encoder 26 upmixes the audio content into a $2^{nd}$ order ambisonics, R=9.

In one aspect, the HOA encoder 26 may encode the signals 76 in the time-frequency domain. In which case, the controller may apply an inverse time-frequency transformation upon the audio signals 77 to transform the signals into the time-domain. In another aspect, the controller may transform the signals 76 into the time-domain before the HOA encoder 26 re-encodes the audio content into the desired HOA format 18. The controller 20 may be configured to store the audio signals 77 in the desired HOA format in storage 27, which may be a storage device (e.g., memory) of the controller 20. In another aspect, the storage 27 may be a part of another electronic device.

In one aspect, the controller may optionally spatially render the encoded HOA data through one or more output devices. For instance, the renderer 28 may receive the audio signals 77 in the encoded HOA format, and may produce one or more rendered (or driver) signals 78 by spatially rendering at least some of the audio signals 77 based on (according to) a speaker layout 19 of an output device, such as the output device 15.

In one aspect, the speaker layout 19 may include an indication of arrangement of speakers of one or more output devices. For example, with respect to the output device 16 that includes five loudspeakers, the speaker layout 19 may indicate the number of loudspeakers and/or the placement of the loudspeakers with respect to each other (and/or with respect to a reference point within the environment, such as a listening position). With respect to the output device 15, the speaker layout 19 may indicate that the speakers are of a headset. The controller 20 may be configured to determine the speaker layout 19 of an output device that may be communicatively coupled to the playback device 14. In another aspect, the controller 20 may determine the layout of an output device that is to (or is) playing back the audio content. As described herein, the speaker layout 19 may be stored in memory of the playback device. In which case, the speaker layout may be provided by an output device through which audio content is being (or to be) played back. For example, the output device 16 may provide the speaker layout to the playback device 14, via a wireless data connection. In another aspect, the speaker layout 19 may be determined through the use of one or more sensors of the system 10, such as a camera. In which case, the camera may capture an image of an output device 16 and may determine the layout of the loudspeaker(s) of the device based on image recognition.

In one aspect, the renderer 28 may perform non-parametric spatial audio rendering upon one or more of the audio signals 77 to produce one or more driver signals. In the case of a headset (e.g., output device 15), the renderer 28 may produce two driver signals. In one aspect, the renderer 28 may apply one or more spatial filters, such as head-related transfer functions (HRTFs) upon the spatially rendered signals. Continuing with the previous example, when the speaker layout 19 indicates a headset, the renderer may perform linear spatial rendering upon the ambisonics audio signals 77 to produce two rendered signals (a left signal and a right signal), and may apply the HRTFs to produce one or more binaural audio signals as the one or more output audio signals 78. In another aspect, the renderer 28 may perform any type of spatially rendering technique to produce spatially rendered audio signals 78 from the audio signals 77 based on the speaker layout 19.

In one aspect, the renderer 28 may adjust rendering based on head tracking data from one or more (head tracking) sensors (not shown) of the system 10. For example, the output device 15 may include one or more head-tracking sensors, which may monitor head movements of the user, and may provide those movements to the renderer 28, which may adjust the spatial rendering accordingly.

Figure 3:
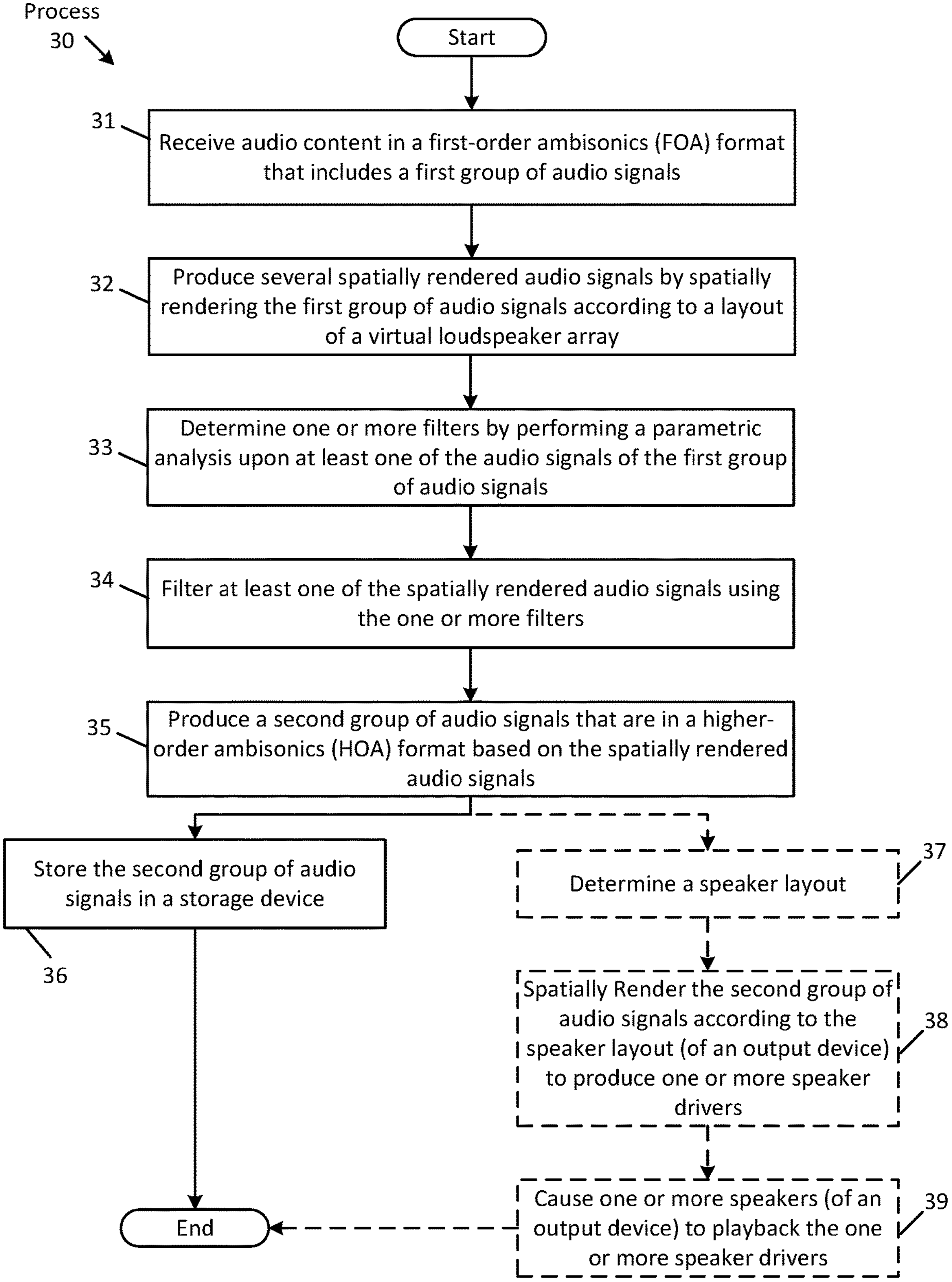
FIG. 3 is a flowchart of one aspect of a process performed by the system to produce the augmented ambisonics format according to one aspect.
Figure 5:
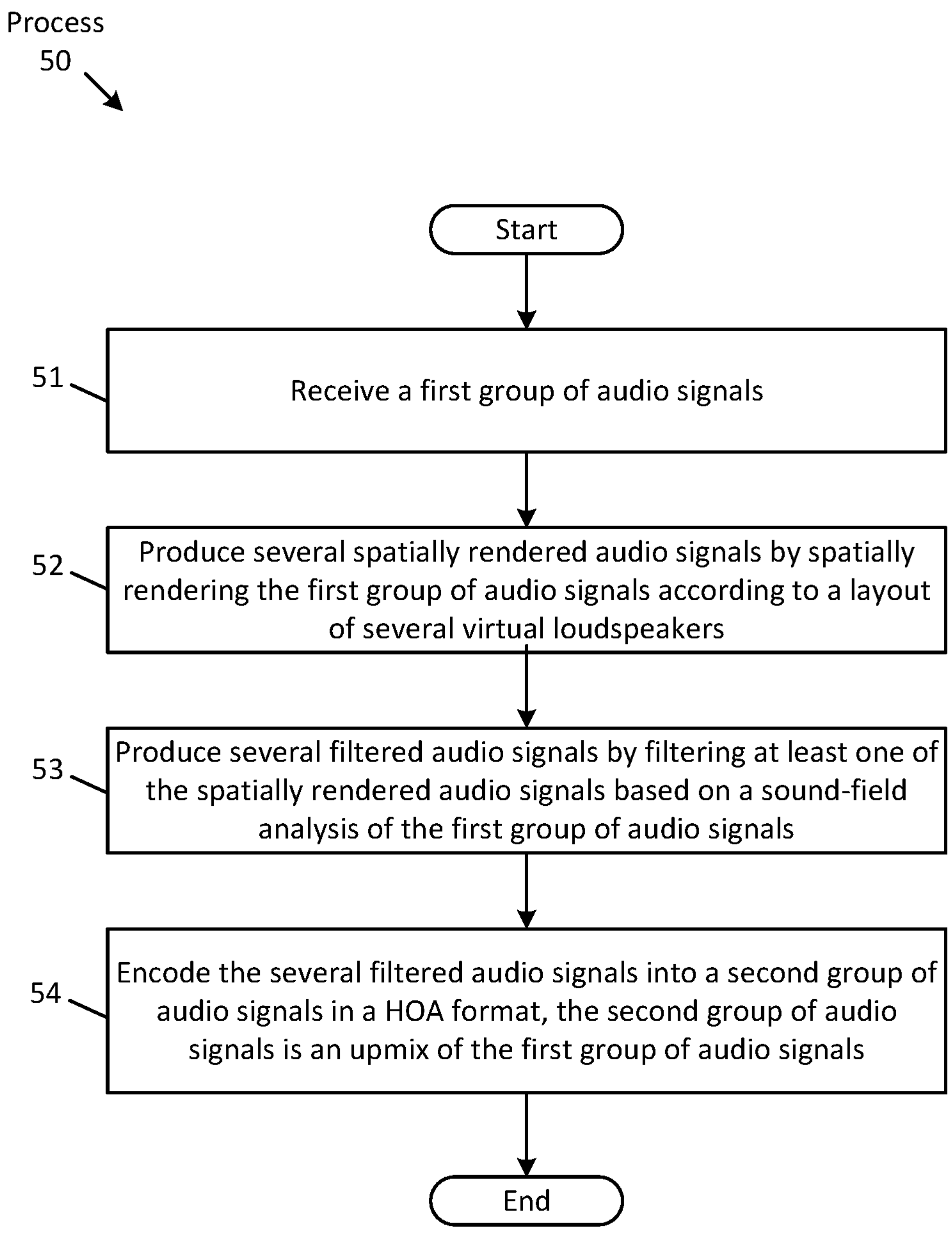
FIG. 5 is a flowchart of another aspect of a process performed by the system to produce an augmented ambisonics format of audio content according to another aspect.

FIGS. 3 and 5 are flowcharts of processes 30 and 50, respectively for performing one or more audio signal processing operations for producing an augmented audio format from another audio format. In one aspect, the processes may be performed by one or more devices of the system 10, as illustrated in FIG. 1. For instance, at least some of the operations of one or more of these processes may be performed by (e.g., the controller 20 of) the playback device 14. As a result, at least some of the operations described herein may be with reference to FIGS. 1 and 2. In another aspect, at least some of the operations may be performed by another device, such as the output device 15 and/or a remote server communicatively coupled to the playback device 14 and/or the output device 15.

Turning to FIG. 3, this figure is a flowchart of one aspect of a process performed by the system 10 to produce an augmented ambisonics format that is an upmixed format of an original ambisonics format according to one aspect. The process 30 begins with the controller 20 receiving audio content in a FOA format that includes a first group of audio signals (at block 31). For instance, the controller 20 may receive the audio signals 71 audio file 17 that includes FOA audio content. The controller 20 produces several spatially rendered audio signals by spatially rendering the audio signals 71 according to a layout of a virtual loudspeaker array (at block 32). For instance, the controller may determine a desired HOA format (e.g., based on user input) for the received FOA data, and may determine the (e.g., t-design) layout based on the desired format. The controller may determine one or more VBAP gains 72 and may apply the gains to the received audio content to produce the spatially rendered audio signals 74.

The controller 20 determines one or more filters 75 by performing a parametric analysis upon at least one of the received audio signals 71 (at block 33). The controller 20 filters at least one of the spatially rendered audio signals (e.g., signals 74) using the one or more filters (at block 34). The controller produces a second group of audio signals (e.g., signals 77) that are in a HOA format based on the spatially rendered audio signals (at block 35). As described herein, the controller 20 may apply the filters 75 to the audio signals 74 that are spatially rendered to produce the filtered audio signals 76, where the controller may encode the audio signals into the HOA format. As described herein the HOA format may be a higher order ambisonics than the FOA of the received audio content. The controller 20 stores the second group of audio signals (e.g., encoded audio signals 77) in a storage device in the desired HOA format, such as storage 27 (at block 36).

In addition, or in lieu of, storing the encoded audio signals, the controller may spatially render the encoded signals for playback through one or more playback devices. The controller 20 may determine a speaker layout (at block 37). For instance, the controller may determine whether an output device, such as the headset 15 is communicatively coupled with the playback device. In which case, the controller may determine its speaker layout (e.g., by performing a table lookup into a data structure that associates speaker layouts with one or more device characteristics, such as a unique identifier of the output device (e.g., a model/serial number)). The controller spatially renders the second group of audio signal according to the speaker layout (of an output device) to produce one or more speaker drivers (at block 38). The controller 20 causes one or more speakers (of the output device) to playback the one or more speaker drivers (at block 39). For instance, the playback device may transmit the driver signals to the output device for playback.

In another aspect, the playback device may spatially render the audio content for playback by one or more speakers that may be a part of the playback device. In which case, the controller 20 may determine a speaker layout of the playback device, and may use the driver signals to drive its speakers for playback.

As described herein, the controller 20 may perform at least some of the operations of process 30. The controller 20 may produce the second group of audio signals in the HOA format, store, and/or spatially render the signals. In another aspect, one or more electronic devices of the system 10 may perform these operations. For example, the media content device 12 may be configured to perform at least some of these operations to produce the audio content in the higher order ambisonics format and to store the audio content, whereas the playback device 14 (and/or output device 15) may spatially render the audio content. In which case, the playback device 14 may be configured to receive the audio content in the HOA format, and may spatially render the audio content for playback, as described herein.

Figure 4:
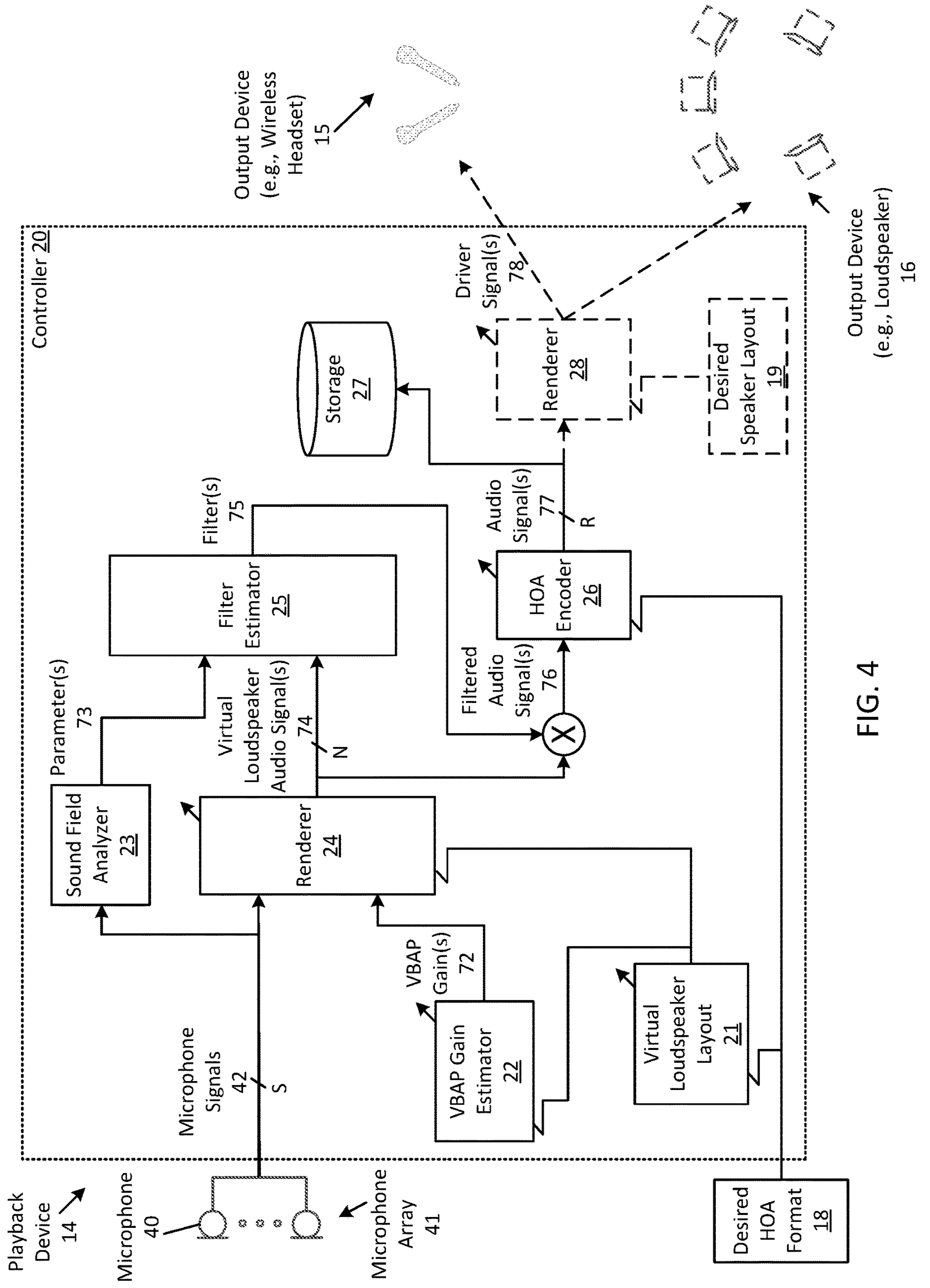
FIG. 4 is a block diagram of a playback device of the system that produces an augmented ambisonics format from microphone signals according to one aspect.

FIG. 4 is a block diagram of a playback device of the system that produces an augmented ambisonics format from one or more microphone signals according to one aspect. The block diagram is similar to the block diagram of FIG. 2, except that the playback device 14 includes a microphone array 41 with one or more microphones 40. In this case, the controller 20 may receive S microphone signals 42, each microphone signal includes sound of an ambient environment captured by a respective microphone 40 of the microphone array 41. In which case, the microphone signals 42 may include a sound field that has one or more sounds of the ambient environment. In one aspect, the microphone array 41 may be a part of or integrated with (e.g., a housing of) the playback device 14. In another aspect, the microphone array 41 may be a part of one or more electronic devices that are located within the ambient environment that may be communicatively coupled with the controller 20. As an example, the microphone array 41 may be a part of the output device 15 that may wirelessly couple to the playback device 14.

In one aspect, the controller 20 may perform one or more operations described herein (e.g., with respect to FIGS. 2 and 3) to produce an augmented ambisonics format from one or more of the S microphone signals 42 captured by the microphone array 41. In which case, the renderer 24 may receive the microphone signals 42 and VBAP gain(s) 72 produced by the estimator based on a desired HOA format, and may spatially render the microphone signals into several virtual loudspeaker audio signals 74 according to a layout of the virtual loudspeakers and using at least some of the VBAP gains. In particular, the sound field analyzer 23 may determine one or more parameters 73 associated with the ambient sound captured by the microphones by performing the parametric analysis upon one or more of the microphone signals 42, as described herein. The renderer 24 may produce spatially rendered audio signals (e.g., signals 74) by spatially rendering the microphone signals to a virtual loudspeaker array, and may produce filtered signals 76 by filtering the spatially rendered signals based on one or more of the parameters. The HOA encoder 26 may encode the filtered signals into HOA signals, as described herein.

As a result, the produced HOA format by the HOA encoder 26 may be an upmix from the microphone signals 42, whereby the produced R HOA signals 77 may include more audio signals than the S microphone signals. Thus, the HOA audio signals 77 may include a sound field that includes one or more sounds of the ambient environment that were captured by the microphone array 41, and is an upmix from the S microphone signals.

FIG. 5 is a flowchart of another aspect of the process 50 performed by the system 10 to produce an augmented ambisonics format of audio content according to another aspect. The process 50 begins with the controller 20 receiving a first group of audio signals (at block 51). For instance, the audio signals may be ambisonics signals that may be a part of an audio file and/or may include one or more microphone signals that includes audio content of an ambient environment. In one aspect, the ambisonics signals may include any type of audio content, such as sound of an XR environment. The controller 20 produces several spatially rendered audio signals by spatially rendering the first group of audio signals according to a layout of several virtual loudspeakers (at block 52). As described herein, the controller may spatially render the signals based on a desired HOA format into which the received signals are to be encoded. The controller 20 produces several filtered audio signals by filtering at least one of the spatially rendered audio signals based on a sound-field analysis of the first group of audio signals (at block 53). The controller may produce filters based on the sound-field analysis in order to sharpen or enhance the spatial resolution of the sound field captured within the received audio signals. The controller 20 encodes the several filtered audio signals into a second group of audio signals in a HOA format, where the second group of audio signals is an upmix of the first group of audio signals (at block 54).

Figure 6:
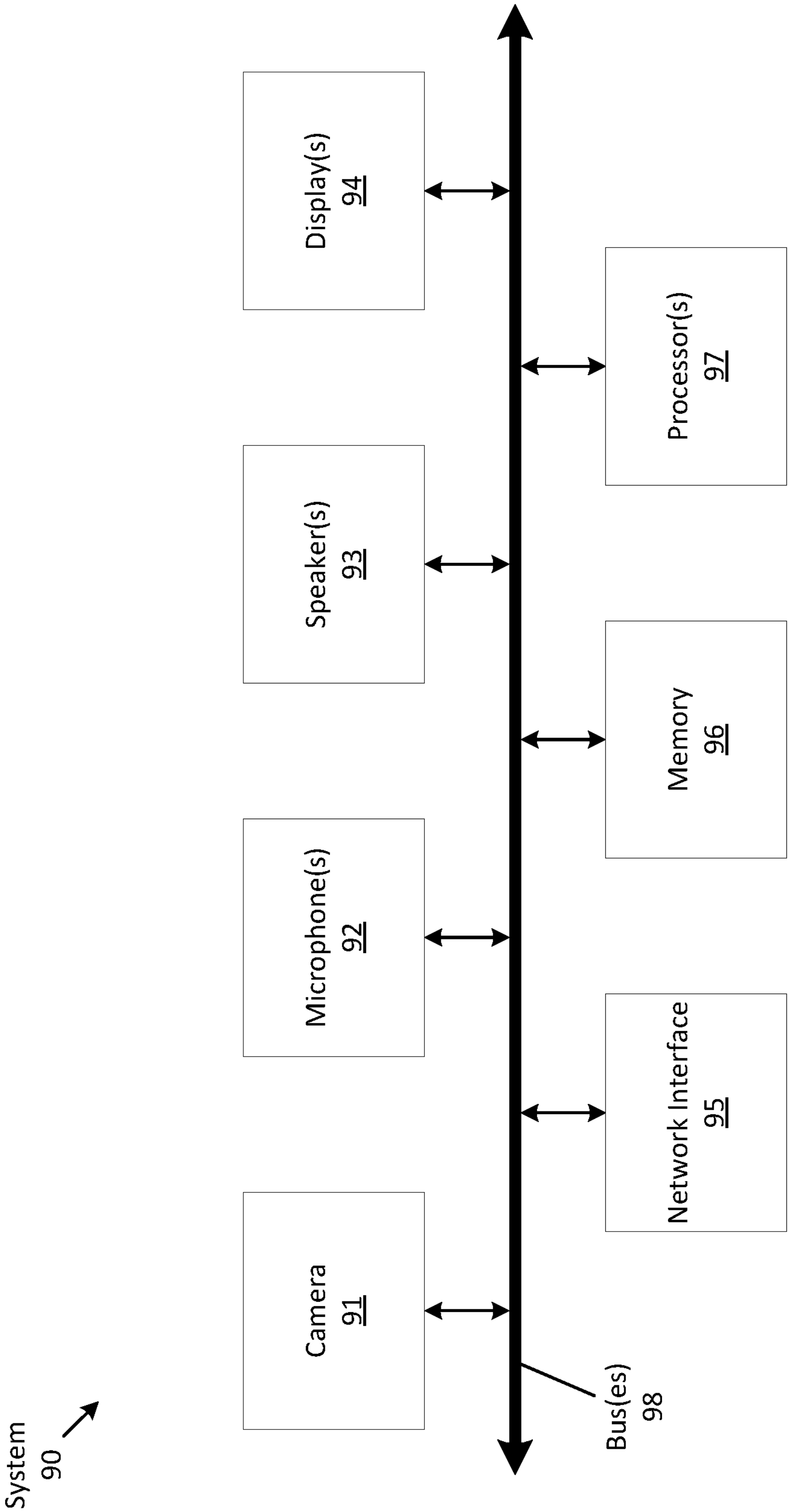
FIG. 6 illustrates an example of system hardware.

FIG. 6 shows a block diagram of hardware of an audio processing system 90, in one aspect, which may be used with or be a part of any of the aspects described herein (e.g., system 10, which may include the media content device 12, playback device 14, and/or output device 15 or 16). This audio processing system 90 can represent a general-purpose computer system or a special purpose computer system. Note that while FIG. 6 illustrates the various components of an audio processing system that may be incorporated into one or more of the devices described herein, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system (or system) 90 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 98 that serve to interconnect the various components of the system. One or more processors 97 are coupled to bus 98 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 96 can include Read Only Memory (ROM), volatile memory, and non-volatile memory, or combinations thereof, coupled to the bus using techniques known in the art. Camera 91, microphone(s) 92, speaker(s) 93, and display(s) 94 may be coupled to the bus.

Memory 96 can be connected to the bus and can include DRAM, a hard disk drive or a flash memory or a magnetic optical drive or magnetic memory or an optical drive or other types of memory systems that maintain data even after power is removed from the system. In one aspect, the processor 97 retrieves computer program instructions stored in a machine-readable storage medium (memory) and executes those instructions to perform operations described herein.

Audio hardware, although not shown, can be coupled to the one or more buses 98 in order to receive audio signals to be processed and output by speakers 93. Audio hardware can include digital to analog and/or analog to digital converters. Audio hardware can also include audio amplifiers and filters. The audio hardware can also interface with microphones 92 (e.g., microphone arrays) to receive audio signals (whether analog or digital), digitize them if necessary, and communicate the signals to the bus 98.

The network interface 95 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 98 can be connected to each other through various bridges, controllers and/or adapters as is well known in the art. In one aspect, one or more network device(s) can be coupled to the bus 98. The network device(s) can be wired network devices (e.g., Ethernet) or wireless network devices (e.g., WI-FI, Bluetooth). In some aspects, various aspects described (e.g., gain estimation, analysis, rendering, filter estimation, ambisonics encoding, etc.,) can be performed by a networked server in communication with one or more devices of the system.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms “analyzer”, “renderer”, “estimator”, “transformer”, “combiner”, “synthesizer”, “controller”, “localizer”, “spatializer”, “component,” “unit,” “module,” “logic”, “extractor”, “subtractor”, “generator”, “optimizer”, “processor”, “mixer”, “detector”, “canceler”, “simulator”, “encoder”, and “decoder” may be representative of hardware and/or software configured to perform one or more processes or functions. For instance, examples of “hardware” include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of “software” includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system’s registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the spatial audio processing operations to produce an augmented (upmixed) ambisonics format from another (e.g., lower ambisonics) format, network operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:

determining a layout of a virtual loudspeaker array based on a desired higher-order ambisonics (HOA) format;

receiving audio content in a first-order ambisonics (FOA) format that includes a first plurality of audio signals;

producing a plurality of spatially rendered audio signals by spatially rendering the first plurality of audio signals according to the layout of the virtual loudspeaker array;

determining one or more filters by performing a parametric analysis upon at least one of the first plurality of audio signals;

producing at least one filtered audio signal by filtering at least one of the plurality of spatially rendered audio signals using the one or more filters; and producing a second plurality of audio signals in the desired HOA format based on the at least one filtered audio signal.

2. The method of claim 1, wherein producing the second plurality of audio signals in the desired HOA format comprises encoding the at least one filtered audio signal according to the desired HOA format.

3. The method of claim 1, wherein determining the layout of the virtual loudspeaker array comprises:

determining an order of ambisonics of the desired HOA format; and determining positions of each virtual loudspeaker of a plurality of virtual loudspeakers about a virtual sphere based on the order of ambisonics.

4. The method of claim 1 further comprising determining one or more vector-base amplitude panning (VBAP) gains based on the layout of the virtual loudspeaker array, wherein the first plurality of audio signals are spatially rendered according to the VBAP gains.

5. The method of claim 1 further comprising storing the second plurality of audio signals in a storage device.

6. The method of claim 1, wherein the layout of the virtual loudspeaker array comprises virtual loudspeakers of the virtual loudspeaker array that are evenly distributed on a surface of a sphere centered around a virtual listening position, wherein each of the spatially rendered audio signals is associated with a respective virtual loudspeaker of the virtual loudspeaker array.

7. The method of claim 1, wherein the parametric analysis produces one or more parameters from the first plurality of audio signals, wherein the one or more filters are determined based on the plurality of spatially rendered audio signals and the one or more parameters, wherein the one or more parameters comprises at least one of a direction of arrival (DoA) associated with a sound source of the audio content, a diffuseness of the audio content, inter-channel level differences between two or more of the first plurality of audio signals, inter-channel time differences between the two or more of the first plurality of audio signals, or inter-channel coherence between the two or more of the first plurality of audio signals.

8. An electronic device, comprising:

at least one processor; and memory having instructions stored therein which when executed by the at least one processor causes the electronic device to:

determine a layout of a virtual loudspeaker array based on a desired higher-order ambisonics (HOA) format;

receive a plurality of microphone signals that includes sound of an ambient environment captured by a plurality of microphones, determine one or more parameters associated with the sound of the ambient environment by performing a parametric analysis upon at least one of the plurality of microphone signals, produce a plurality of spatially rendered audio signals by spatially rendering the plurality of microphone signals according to the layout of the virtual loudspeaker array, producing a plurality of filtered audio signals by filtering at least one of the spatially rendered audio signals based on the one or more parameters, and encoding the plurality of filtered audio signals into a plurality of higher-order ambisonics (HOA) signals.

9. The electronic device of claim 8, wherein the instructions to determine the layout comprises instructions to:

determine an order of ambisonics of the desired HOA format; and determine positions of each virtual loudspeaker about a virtual sphere based on the order of ambisonics.

10. The electronic device of claim 8, wherein the memory comprises further instructions to determine one or more vector-base amplitude panning (VBAP) gains based on the layout of the virtual loudspeaker array, wherein the plurality of microphone signals are spatially rendered using the VBAP gains.

11. The electronic device of claim 8, wherein the layout of the virtual loudspeaker array comprises an even distribution of the virtual loudspeaker array on a surface of a sphere centered around a virtual listening position, wherein each of the plurality of spatially rendered audio signals is associated with a respective virtual loudspeaker of the virtual loudspeaker array.

12. The electronic device of claim 8, wherein the plurality of HOA signals comprises a sound field that includes the sound of the ambient environment and includes a greater number of signals than a number of signals of the plurality of microphone signals.

13. The electronic device of claim 8, wherein the plurality of microphones are a part of the electronic device that is located within the ambient environment.

14. A processor of an electronic device configured to:

determine a layout of a plurality of virtual loudspeakers using on a desired higher-order ambisonics (HOA) format;

receive a first plurality of audio signals;

produce a plurality of spatially rendered audio signals by spatially rendering the first plurality of audio signals according to the layout of the plurality of virtual loudspeakers;

produce a plurality of filtered audio signals by filtering at least one of the spatially rendered audio signals based on a sound-field analysis of the first plurality of audio signals; and encode the plurality of filtered audio signals into a second plurality of audio signals in the desired HOA format, wherein the second plurality of audio signals includes more audio signals than the first plurality of audio signals.

15. The processor of claim 14 is further configured to:

determine one or more vector-base amplitude panning (VBAP) gains based on the desired HOA format, wherein the first plurality of audio signals are rendered using the one or more VBAP gains.

16. The processor of claim 14 is configured to determine the layout of the plurality of virtual loudspeakers by:

determining an order of ambisonics of the desired HOA format; and determining positions of each virtual loudspeaker of the plurality of virtual loudspeakers about a virtual sphere based on the order of ambisonics.

17. The processor of claim 14, wherein the layout of the plurality of virtual loudspeakers comprises an even distribution of a virtual loudspeaker array on a surface of a sphere centered around a virtual listening position.

18. The processor of claim 14 is further configured to at least one of:

store the second plurality of audio signals in the desired HOA format in memory of the electronic device; and produce a plurality of speaker drivers to drive a plurality of speakers by spatially rendering the second plurality of audio signals according to a speaker layout of the plurality of speakers.

19. The processor of claim 14, wherein the first plurality of audio signals is in a first-order ambisonics (FOA) format.

20. The processor of claim 14, wherein the first plurality of audio signals are microphone signals captured by a plurality of microphones.

* * * * *